Feb. 25, 1969 T. H. COUR 3,429,925
MANUFACTURE OF DIMETHYLETHANOLAMINE
Filed Nov. 3, 1965
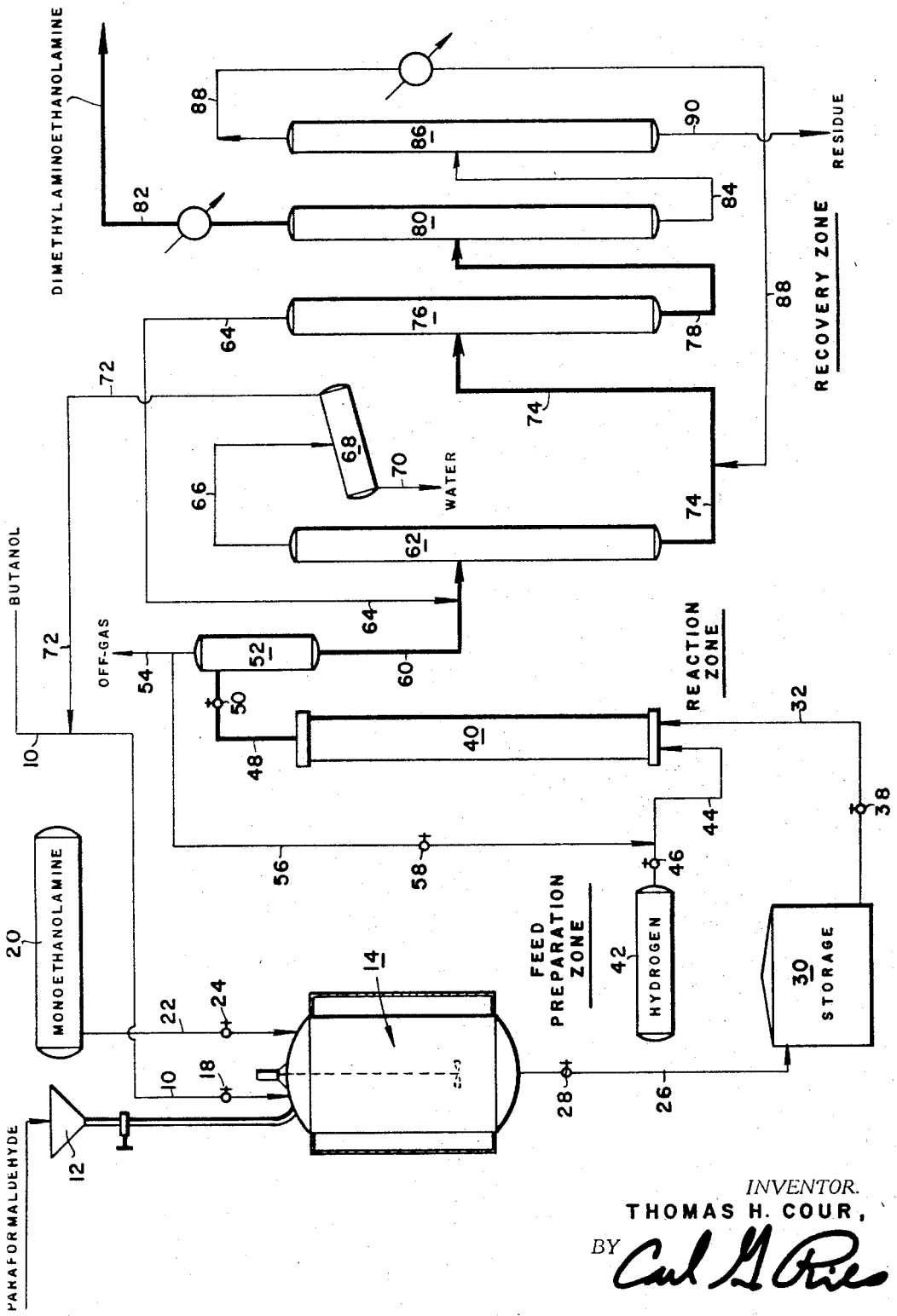
INVENTOR.
THOMAS H. COUR,
BY Carl G. Ries
ATTORNEY

United States Patent Office 3,429,925
Patented Feb. 25, 1969

3,429,925
MANUFACTURE OF DIMETHYLETHANOLAMINE
Thomas H. Cour, 1808 Vallejo, Austin, Tex. 78757
Filed Nov. 3, 1965, Ser. No. 506,208
U.S. Cl. 260—584  4 Claims
Int. Cl. C07c 91/08, 85/08

ABSTRACT OF THE DISCLOSURE

An improvement for the preparation of dimethylethanolamine—wherein a two-mol formaldehyde adduct of monoethanolamine is reacted with hydrogen—is obtained by carrying out the reaction in a non-tertiary butanol solvent and distilling the reaction mixture.

---

This invention relates to a method for the manufacture of dimethylethanolamine. More particularly, this invention relates to a method for the manufacture of dimethylethanolamine from monoethanolamine.

Dimethylethanolamine is a compound having the formula:

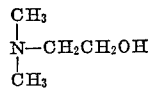

which is useful for a wide variety of purposes. For example, it may be used as a starting material for the preparation of surface-active agents or as a catalyst in the manufacture of urethanes from organic isocyanates and hydroxy-containing compounds.

Although dimethylethanolamine can be prepared by the ethoxylation of dimethylamine, the process presents a great many difficulties, both with respect to the efficiency of the reaction and with respect to the recovery of the product. For example, the final product by this method is frequently off-color and requires careful control and additional treating steps in order to provide for a substantially colorless, substantially pure product.

In accordance with the present invention, dimethylethanolamine is prepared by reacting a two-mol formaldehyde adduct of monoethanolamine in a butanol solvent with hydrogen in the presence of a hydrogenation catalyst to provide a crude reaction mixture containing solvent, water and dimethylethanolamine and by-products from which a substantially pure, substantially colorless product can be obtained in substantially quantitative yield by a simple distillation technique, as hereinafter described in greater detail.

The starting material for the present invention is a two-mol formaldehyde adduct of monoethanolamine. However, since water is formed during the hydrogenation of this material, and since dimethylethanolamine is removed from water only with difficulty, it is preferable to employ a feedstock for the process which is substantially free from water. Accordingly, although the two-mol formaldehyde adduct of monoethanolamine may be prepared by the simple addition of monoethanolamine to formalin, it is preferable to use a substantially anhydrous formaldehyde source such as paraformaldehyde trioxane, etc. Moreover, since the hydrogenation reaction is conducted in solvent solution, it is preferable to prepare the two-mol formaldehyde adduct of monoethanolamine by reacting the paraformaldehyde or equivalent source of formaldehyde with monoethanolamine in solution with the same solvent which is employed for the hydrogenation step. It has been discovered in accordance with the present invention that non-tertiary butanols (n-butanol, iso-butanol, sec-butanol) are unique solvents which provide for significant advantages that are not obtainable with other closely related solvents such as methanol, ethanol or the propanols. Therefore, the two-mol monoethanolamine adduct of formaldehyde is preferably prepared by dissolving paraformaldehyde, trioxane or an equivalent material in a butyl alcohol and my adding monoethanolamine to the solvent solution with a molar ratio of 0.5 mol of monoethanolamine per mol of formaldehyde.

The reaction is substantially quantitative when the solution is permitted to digest at a suitable temperature such as one within the range of about 20° to about 60° C. for a reasonable period of time (e.g., one to five hours). It is preferable to employ about equal weights of paraformaldehyde, monoethanolamine and about 200 wt. percent of solvent, based on the reactants. However, greater or lesser amounts of solvent may be used as desired. Thus, from about one to about six parts of solvent per part of reactant may be employed with good results.

The formaldehyde addition reaction may be conducted in a continuous or batch process, but is preferably prepared on a batch basis for convenience. In contrast, the hydrogenation reaction is preferably conducted on a continuous basis, although batch hydrogenation may be employed if desired. Thus, the overall process is semi-continuous with respect to the preparation of the two-mol formaldehyde adduct of monoethanolamine and continuous with respect to the hydrogenation reaction.

The hydrogenation reaction is suitably conducted by contacting the butanol solution of the two-mol adduct of monoethanolamine with a hydrogenation catalyst under appropriate hydrogenation conditions including, for example, a temperature within the range of about 50° to about 150° C., a pressure within the range of about 50° to about 150° C., a pressure within the range of about 500 to about 5,000 p.s.i.g. and a charge rate of about 0.2 to 2 pounds of adduct per hour per pound of catalyst. The hydrogen is preferably employed in an amount which is from about 50% to about 500% in excess of the amount theoretically required for the hydrogenation.

Although any of the known hydrogenation catalysts may be employed such as nickel, copper, cobalt, etc., hydrogenation catalyst, a preferred catalyst is a three-component catalyst containing about 60 to about 85 mol percent of a first component selected from the class consisting of nickel and cobelt, from about 14 to about 37 mol percent of copper and from about 1 to about 5 mol percent of a third component selected from the class consisting of nonreducible oxides of chromium, manganese, molybdenum and thorium. More preferably, the cataylst will be composed of about 72 to 78 mol percent of the first component, about 20 to 25 mol percent of the second component and 1 to 3 mol percent of the third component. Catalysts of this nature are disclosed, for example, in Moss U.S. Patent No. 3,152,998. As is pointed out in the patent, it is preferable to use chromium oxide as the third component.

The preferred catalyst may be prepared from mixtures of oxides of the three components. For example, soluble salts such as the nitrates of nickel or cobalt, copper and the third component (e.g., chromium) may be prepared in an aqueous solution and precipitated therefrom as carbonates by the addition of solid ammonium carbonates. The precipitate is recovered, dried and calcined at 300° to 400° C. until the carbonate salts have been converted to the corresponding oxides. Preferably, the oxides are then pelleted and reduced in the presence of molecular hydrogen at about 250° to 400° C. until the nickel or cobalt oxide has been reduced to metallic nickel or metallic cobalt. As a consequence, the copper may also be reduced to metallic copper. However, the third component will remain a pelleted catalyst as the oxide.

Catalyst pellets of this nature are extremely hard and durable and do not disintegrate when used in the preparation of dimethylethanolamine under the aqueous high temperature, high pressure reaction conditions employed in accordance with the present invention.

As has been mentioned, it has been discovered in accordance with the present invention that butanol should be employed as solvent for the process. When lower aliphatic alcohols are employed, it is necessary to employ additional distillation steps or drying steps, or both, in order to avoid significant loss of dimethylethanolamine. With higher alcohols, the distillation is complicated by an overlap between the boiling range of dimethylethanolamine and the solvent.

The invention will be further illustrated by the following specific example, which is described in conjunction with the accompanying drawing, which is a schematic flow sheet of the preferred embodiment of the present invention.

In the description, where parts are mentioned, they are parts by weight. In the drawing conventional details such as pumps, reflux condensers, reboilers, control elements, etc., have been eliminated in order to avoid undue complication of the drawing. They constitute conventional equipment details known to those skilled in the art.

Turning now to the drawing, a butanol, such as isobutanol from any suitable source, is charged by way of a line 10 controlled by valve 18 to reactor 14 and a suitable source of formaldehyde such as paraformaldehyde or trioxane is thereafter charged to reactor 14 by way of conduit 12. From about 2 to 10 parts of butanol are preferably employed per part of paraformaldehyde.

Next, monoethanolamine from storage tank 20 is metered into the kettle by way of a line 22 controlled by a valve 24 at a rate such that the temperature is maintained within the range of from about 20° to about 60° C. As a consequence, a non-catalytic exothermic reaction will occur whereby the two mols of formaldehyde will react with each mol of monoethanolamine at the site of the reactive amino hydrogens to provide for a butanol solution of the two-mol formaldehyde adduct of monoethanolamine. In order to insure substantially complete reaction, the reactants are preferably digested in the kettle 14 for an appropriate period of time, such as one to six hours. Thereafter, the solution is discharged from kettle 14 by way of a line 26 controlled by valve 28 leading to storage tank 30.

The solution of the two-mol adduct is continually withdrawn from the storage tank 30 by way of a line 32 controlled by a valve 38 leading to an appropriate reaction zone 40 containing a suitable hydrogenation catalyst such as a pelleted nickel, copper, chromium oxide catalyst of the type described above. Hydrogen, in from about 50% to 200% in excess of the amount theoretically required for hydrogenation of the two-mol adduct, is also charged to the reactor 40 from a suitable storage tank 42 by way of a line 44 controlled by a valve 46.

The reaction conditions within the reactor 40 will suitably include a temperature within the range of about 50° to about 150° C., a pressure within the range of about 500 to about 5,000 p.s.i.g. and a flow rate within the range of about 0.2 to about 2 pounds of solution per pound of catalyst per hour.

Within the reactor 40 and under the described reaction conditions, substantially complete hydrogenation of the two-mol adduct can be achieved whereby the effluent liquid reaction mixture will be principally composed of butanol solvent, dimethylethanolamine and water. Only minor quantities of reaction by-products will be formed.

The effluent leaves reactor 40 by way of a line 48 leading though a pressure-reducing valve 50 to a drum 52 for separation of off gas from the normally liquid components of the reaction mixture. Off gas is discharged from drum 52 by way of a line 54. It is normally desirable to recycle at least a portion of the off gas by way of a line 56 controlled by a valve 58 leading to hydrogen charge line 44.

The liquid components of the reaction mixture are discharged from drum 52 by way of a line 60 leading to a first distillation zone 62 where the crude reaction components, together with recycle fraction 64 (to be subsequently described) are separated into a distillate fraction 66 composed principally of water and butanol and containing only a very minor amount of diaminoethanolamine. The distillate fraction 66 is preferably accumulated in a decanter 68 from which water is removed by way of a line 70. The de-watered fraction is suitably recycled by way of a line 72 to the butanol charge line 10 for the storage tank 12.

In accordance with the present invention, distillation conditions in the first distillation zone 62 are adjusted so that butanol will be present in a higher boiling dimethylethanolamine fraction 74. Fraction 74 is charged to a second distillation zone 76 wherein a distillate fraction 64 is recovered which is composed of substantially all of the butanol charged to the second distallation zone 76 and some of the dimethylethanolamine. Fraction 64 is suitably recycled to the charge line 60 for the first distillation zone 62 in the manner described above. The higher boiling fraction 78 is charged to a third distillation zone 80 wherein a substantially pure dimethylethanolamine fraction is recovered by way of a line 82. A higher boiling fraction 84 containing at least about 30 wt. percent dimethylethanolamine is also preferably taken and charged to a distillation zone 86, wherein it is separated into a lower boiling fraction 88 which is recycled to the charge line 74 for the second distillation zone 76 and a higher boiling residue fraction 90 which is discarded from the system.

In a representative run conducted in the manner described above, about one part of paraformaldehyde was added to about three parts of isobutanol to provide a paraformaldehyde slurry which was reacted with about 0.5 part of monoethanolamine per part of solution in the kettle 14. After digestion, the thus-prepared two-mol formaldehyde adduct of monoethanolamine was hydrogenated in a reaction zone 40 to provide a reaction product containing about 50 wt. percent of butanol, the remainder being principally dimethylethanolamine. Only a minor amount of dimethylethanolamine (less than 1% of the total) was present in the fraction 66. The fraction 82 was a colorless dimethylethanolamine product which titrated as 100% dimethylethanolamine and which had an indicated purity of about 98% by gas-liquid chromatography.

I claim:
1. In a process for the production of dimethylethanolamine wherein two-mol formaldehyde adducts of monoethanolamine in solution in a solvent are contacaed with hydrogen in the presence of a hydrogenation catalyst to provide a reaction mixture comprising solvent, water and dimethylethanolamine, the improvement which comprises:
   carrying out the reaction in the presence of an n-butanol, iso-butanol or secondary butanol solvent and
   distilling, the reaction product containing dimethylethanolamine to recover a water-butanol distillate fraction, a butanol-dimethylethanolamine distillate fraction and dimethylethanolamine fraction.
2. A method as in claim 1 wherein the solvent is n-butanol.
3. A method as in claim 1 wherein the solvent is iso-butanol.
4. A method as in claim 1 wherein the solvent is secondary butanol.

References Cited

UNITED STATES PATENTS 2,373,705  4/1945  Olin et al. _____ 260—583

CHARLES B. PARKER, *Primary Examiner.*

R. L. RAYMOND, *Assistant Examiner.*